United States Patent [19]
McEvoy

[11] 3,769,601
[45] Oct. 30, 1973

[54] FAST AVERAGING NOISE SUMMING CIRCUIT FOR AUTOMATIC SIGNAL DETECTION

[76] Inventor: William J. McEvoy, 320 Lafayette Dr., Oxnard, Calif. 93030

[22] Filed: June 19, 1972

[21] Appl. No.: 263,804

[52] U.S. Cl................... 329/110, 325/65, 325/473, 329/136
[51] Int. Cl. ............................................. H03d 3/00
[58] Field of Search..................... 329/136, 110, 112, 329/205 R; 325/65, 473–478

[56] References Cited
UNITED STATES PATENTS

| | | | |
|---|---|---|---|
| 3,213,450 | 10/1965 | Goor............................... | 325/474 X |
| 3,688,205 | 8/1972 | Burger............................ | 325/474 X |
| 3,480,867 | 11/1969 | Sichak............................. | 325/476 |
| 3,422,364 | 1/1969 | Craven et al.................... | 329/205 R |
| 3,700,812 | 10/1972 | Springett........................ | 325/473 X |
| 3,611,149 | 10/1971 | Kimball.......................... | 325/473 X |

Primary Examiner—Alfred L. Brody
Attorney—Richard S. Sciascia, David O'Reilly and J. M. St. Amand

[57] ABSTRACT

An electrical circuit adapted to provide reliable signal detection in the presence of varying noise levels. The circuit adjusts automatically so that a fixed signal to noise detection ratio is maintained, even though the receiver noise output varies as a function of frequency due to internal or external conditions. Two networks average receiver power simultaneously. One network has a long time constant (approximately $15\mu$ sec.) while the other has a short time constant (approximately $1\mu$ sec.). The receiver output is applied to the long time constant (LTC) and short time constant (STC) networks which provide inputs to a differential amplifier. When a signal is received, the differential amplifier produces an output pulse which is the difference between the slopes produced by the LTC and STC networks.

12 Claims, 2 Drawing Figures

3,769,601

FAST AVERAGING NOISE SUMMING CIRCUIT FOR AUTOMATIC SIGNAL DETECTION

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The present invention relates generally to signal detection circuits and more particularly relates to a circuit for automatic signal detection in the presence of varying noise levels.

In the field of signal detection, squelch and threshold detection circuits generally operate by presetting a bias level on a detector or amplifier. The bias level is obtained by rectifying the noise output of the receiver and filtering with a long time constant. Among the circuits which utilize threshold detection are the automatic lock-on circuit with a varying bias level. One frequent problem with this type of circuit is the high percentage of false stops and is a common problem in automatic frequency scanning receivers. As can be expected, attempts to remedy this problem by increasing the threshold detection level to eliminate the false stops effectively reduces receiver sensitivity by a corresponding amount for automatic signal detection. Loss of sensitivity degrades signal detection capability, reducing receiver performance to a marginal level.

Automatic frequency scanning receivers with lock-on circuits provided by threshold detectors with a varying bias level have problems due to varying noise levels caused by a number of factors. The following factors should be considered when examining variations in receiver noise level output:

a. Environment changes due to an aircraft moving from a low ambient noise level to a high ambient noise level such as an aircraft flying over the ocean and approaching an industrial area.

b. Variations for frequencies below 200 MHz due to antenna rotation which may be one instant looking over the ocean and, the next, looking over an industrial area.

c. Receiver bandwidth usually of the order of 10 MHz to provide a fast rise time.

d. Receiver noise figure which increases as frequency increases.

e. Receiver bandpass ripple.

f. Variation of receiver output noise figure due to changing frequency range such as low to high frequency limits of a tuner.

g. Receiver output noise level variations due to switching from one receiver to another.

h. Noise level output variations due to any form of intermittent receiver blanking.

i. Increases in receiver output power when locked on to an emitter.

SUMMARY OF THE INVENTION

The purpose of the present invention is to provide maximum signal detection in the presence of varying noise levels. The present invention is an improvement of a prior invention disclosed in Patent application Ser. No. 40,029, filed May 25, 1970, now U.S. Pat. No. 3,681,698. The novel detection circuit utilizes a long time constant network and a short time constant network which receive the input signal with noise and provide different sloped outputs to a differential amplifier. The differential amplifier provides an output pulse indicative of the difference between the slopes of the long time constant network and the short time constant network. The novel circuit is particularly advantageous in automatic frequency scanning receivers because sensitivity and the ability to discriminate r.f. signals from noise are maintained at a maximum level. False signal lock-ons (false stops) due to varying noise levels are kept to a minimum because the circuit maintains a fixed signal-to-noise detection ratio even though a receiver noise output varies due to internal and/or external conditions.

OBJECTS OF THE INVENTION

Accordingly, one object of the present invention is to provide a circuit having improved signal detection capabilities.

Another object of the present invention is to provide a circuit with improved signal detection capabilities in the presence of varying noise levels.

Yet another object of the present invention is to provide a circuit which minimizes false lock-ons in automatic frequency scanning receivers.

Other objects, advantages and novel features of the invention will become apparent from the following detailed explanation when considered in conjunction with the accompanying drawings.

DETAILED DESCRIPTION OF THE PREFERRED EMBODIMENT

Figure 1:
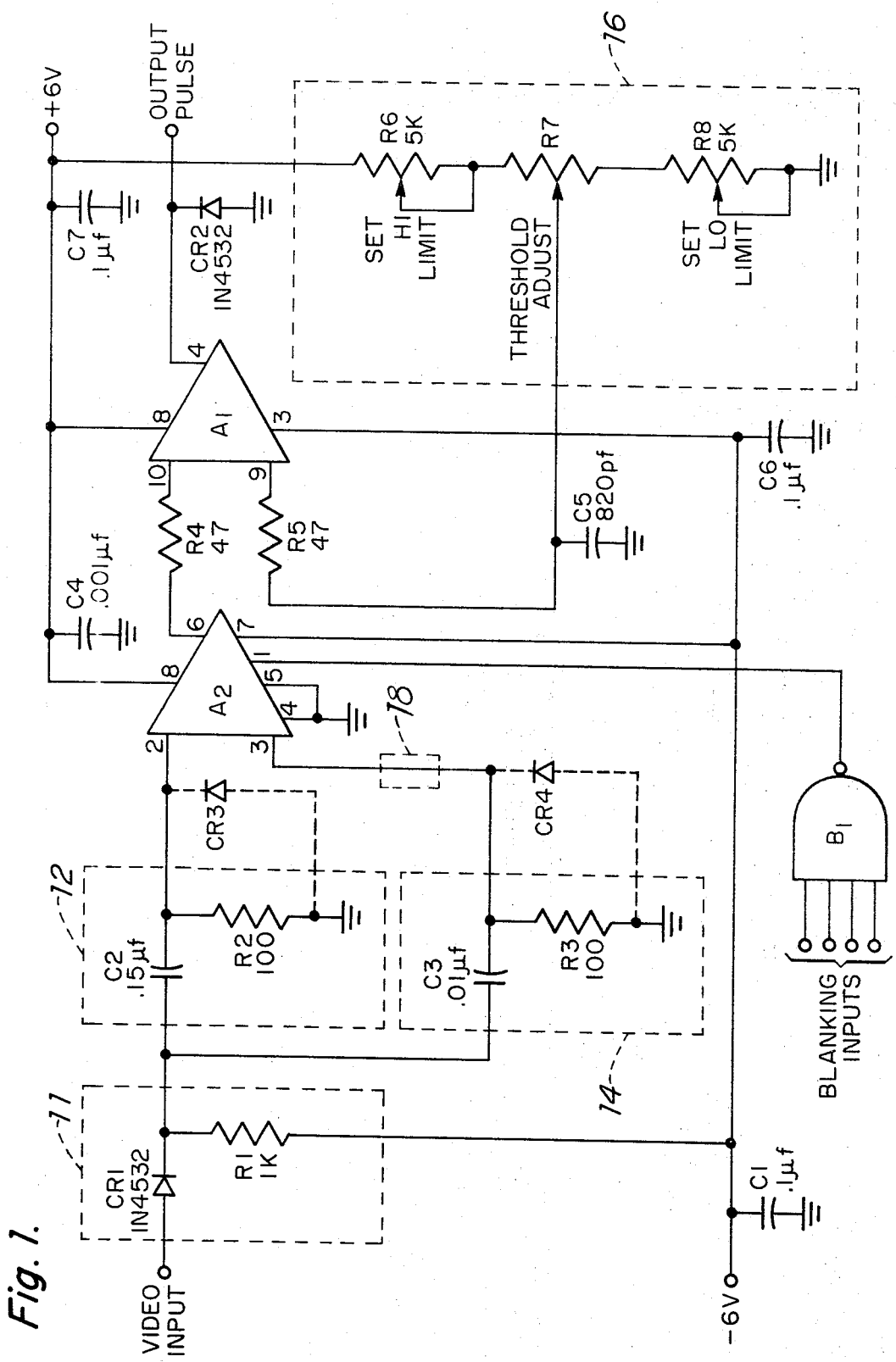
FIG. 1 is a detailed schematic diagram of the fast-averaging noise-summing automatic signal detector.

The schematic diagram of the automatic signal detector in FIG. 1 shows the output of a receiver fed into a detector 11, long time constant (LTC) circuit 12 and short time constant (STC) circuit 14. In some cases, an impedance matching circuit may be desirable at the input to the signal detector. The output of the LTC and STC circuits are then fed to a gated differential amplifier $A_2$ which produces an amplified output indicative of any difference between the two inputs. The differential output is fed to amplifier and lever shifter $A_1$, which has a gain such that a standardized pulse results at the output. A threshold circuit 16 is provided to bias amplifier $A_1$.

This output is fed to gate and stop latch circuits (not shown) which act to stop the receiver sweep when a signal is received at the input. The stop latch is reset by the receiver resume sweep signal. The stop sweep signal is also applied to blanking gate $B_1$, which inhibits differential amplifier $A_2$ and prevents the receiver from stopping until the resume sweep is initiated. Other blanking signals applied to blanking gate are band switching, radar blanking and receiver blanking periods. This is required for periods between band changes, radar blanking (if the receiver is to be employed in the vicinity of radar transmitters), and for receiver blanking on synthesizer spurious responses.

The automatic signal detector shown in the schematic of FIG. 1 operates in the following manner. Video input is applied across detector diode $CR_1$, LTC circuit $C_2$, $R_2$ and STC circuit $C_3$, $R_3$. To prevent signal attenuation across detector diode $CR_1$, a back bias is applied to reduce its dynamic resistance to approximately 2 ohms. This is accomplished by providing a current path of approximately 10 milliamps from −6 volts through resistor $R_1$ and detector diode $CR_1$ to a +6 volts in the receiver, preferably through a complementary emitter follower which provides isolation. This provides approximately a 6 db increase in sensitivity of the automatic detector circuit.

When a radar pulse or signal is present in the video input, $C_3$ of the STC circuit charges faster than $C_2$ of the LTC circuit, thereby creating a potential difference between inputs 2 and 3 of differential amplifier $A_2$. The LTC circuit of $C_2$, $R_2$ has a time constant of approximately 15 microseconds while STC circuit of $C_3$, $R_3$ has a time constant of approximately 1 microsecond. This provides a ratio of LTC to STC of 15 to 1, which is considered a good optimum value. These values can vary but it is important that there is a definite slope difference in these outputs from an incoming signal.

Differential amplifier $A_2$ has approximately a 16 db gain. When the inputs to differential amplifier are equal, the output is zero. When there is a potential difference across the input, this difference is amplified 16 db or approximately six times. As a result, a differential output occurs from amplifier $A_2$ whenever there is a potential difference at the input from the STC and LTC circuits. The wider the pulse or signal is, the greater the difference.

The output of amplifier $A_2$ is fed to amplifier $A_1$, which is also a differential amplifier connected single-ended with a controlled reference voltage which functions as a threshold. Amplifier $A_1$ is connected open loop with a gain of 60 db. When amplifier $A_2$ detects a signal and amplifies the difference six times, this will exceed the threshold setting on amplifier $A_1$, driving it into saturation, which provides a pulse output. Diode $CR_2$ prevents any negative spikes on the output pulse.

The threshold for amplifier $A_1$ is provided by voltage divider network comprised of $R_6$, $R_7$ and $R_8$. Adjustment of the threshold input to amplifier $A_1$ compensates for noise generated in differential amplifier $A_2$ and the small noise leakage of $A_2$ constantly presented at the input of $A_1$. The threshold bias input of $A_1$ is adjusted to slightly exceed the noise level so there is no output as a result of the noise from amplifier $A_1$.

The voltage divider network of $R_6$, $R_7$ and $R_8$ allows the operator to vary the threshold within a preset range from maximum sensitivity to totally disabling the circuit. Potentiometer $R_8$ is preset to establish the minimum threshold level and potentiometer $R_6$ is preset to establish the maximum threshold level which disables the circuit. Of course, $R_6$ and $R_8$ could be fixed resistors or eliminated altogether. However, they are preferred for the purpose of limiting the threshold within certain limits.

Blanking is provided by gate $B_1$. A Motorola gate MC 30252 was utilized in the preferred embodiment and required negative logic. When no blanking is applied, the output of gate $B_1$ should be between 0.45 volts and ground to provide maximum gain from amplifier $A_2$. When blanking is applied, the output of $B_1$ goes high, reducing the gain of amplifier $A_1$ to an inoperable level. The output of gate $B_1$ should exceed 1.5 volts to reduce the gain of amplifier $A_1$ to −60 db. Capacitors $C_1$, $C_4$, $C_6$ and $C_7$ are by-pass condensers to prevent circuit oscillation from power sources while $C_7$ is an R.F. by-pass condenser to prevent oscillation in amplifier $A_1$.

As indicated above, when the two inputs to amplifier $A_2$ are equal, the output is zero. In the circuit of FIG. 1, $A_2$ is a gated differential video amplifier whose two inputs consist of high-passed signal-plus-noise with two different time constants. The difference between the STC and LTC circuits is negligible for pulses whose spectral components are well above the corner frequencies of the two circuits, hence, high frequency noise essentially stops here. That is, when noise spikes are applied to the circuit, the two time constant circuits do not have the time to charge, as the noise spikes are short in duration compared to the one and fifteen microsecond circuits. Therefore, the inputs to amplifier $A_2$ due to noise are essentially the same and there is no output.

However, the difference between the LTC circuit 12 and STC circuit 14 can cause a slight phase shift (i.e. phase lead from STC circuit 14) affecting the noise cancellation efficiency of differential amplifier $A_2$. This phase shift can be corrected by the addition of a delay line 18 between STC circuit 14 and amplifier $A_2$. A variable delay line adjustable between 1 to 45 nanoseconds was found to be suitable in practice. Of course, the phase shift may also be corrected by reducing the ratio between the LTC and STC. For instance, by changing the STC to 5 microseconds (i.e. change capacitor $C_3$ to $0.05\mu f$). This is a less satisfactory solution because it would reduce sensitivity.

Some compensation may be needed to balance the inputs to Amplifier $A_2$ because of slight attenuation of the STC output by delay line 18. This can be accomplished by changing resistor $R_2$ to a potentiometer of the same value with the center tap connected to pin 2 of amplifier $A_2$. This would provide an additional advantage in that it would allow balancing of the noise spike amplitudes at pins 2 and 3 of $A_2$.

Figure 2:
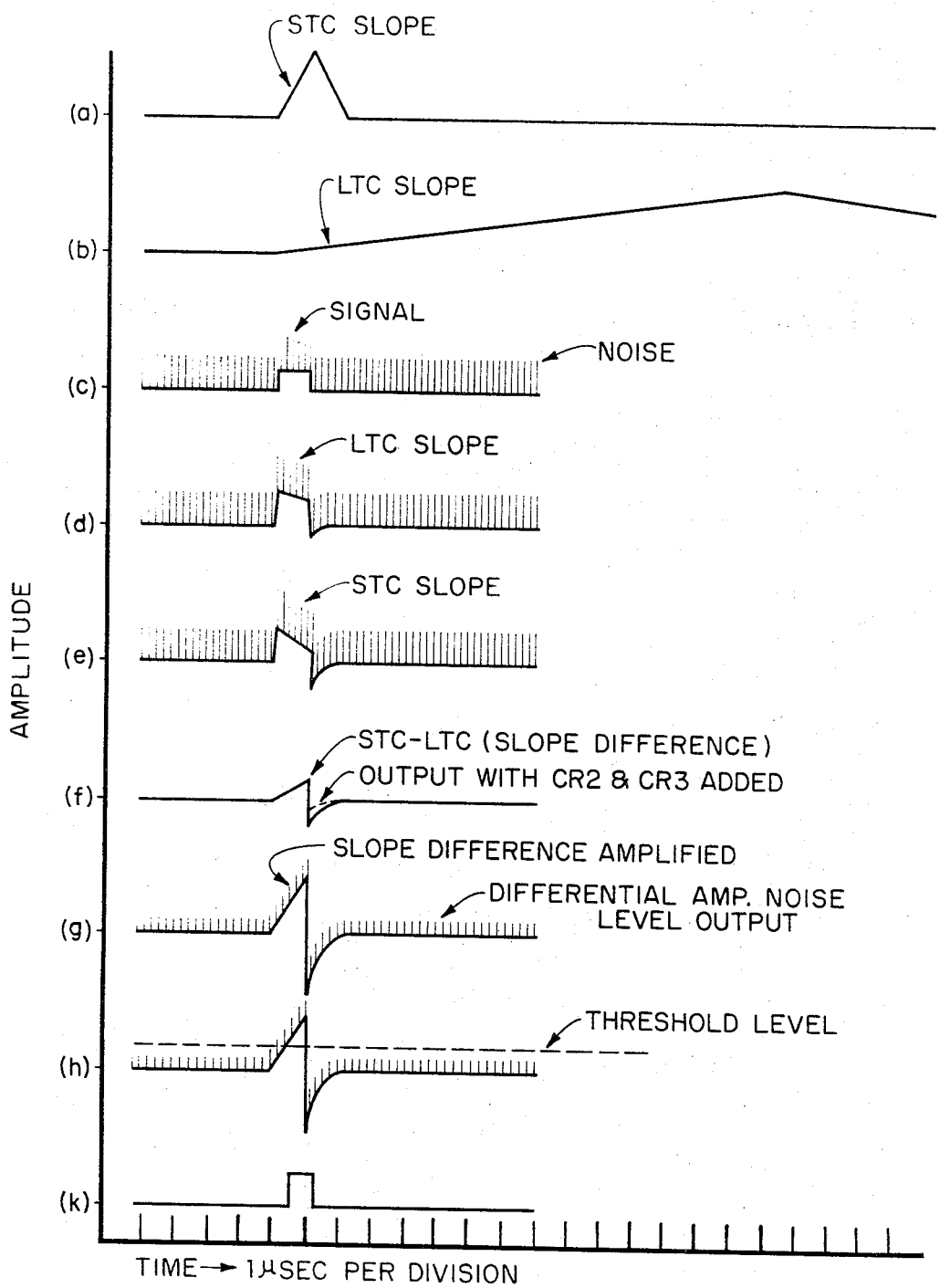
FIG. 2 illustrates voltage waveforms to facilitate understanding of the automatic signal detector of FIG. 1.

FIG. 2 shows voltage waveforms which illustrate the operation at various stages of the automatic signal detection circuit. FIGS. 2a and 2b illustrate the variation in slope of the STC and LTC circuits. FIG. 2c shows a signal in the presence of noise. Note that the signal is of substantially longer duration than any of the noise. One limitation on the detection circuit would be where the pulse width gets so narrow that it approaches the width of some of the noise peaks. FIG. 2d and 2e show the inputs from the LTC and STC circuits to amplifier $A_2$. The slope difference between the LTC and STC is shown in FIG. 2f. The output of amplifier $A_2$ will be the slope difference amplified in FIG. 2g. FIG. 2h shows the input to amplifier $A_1$ which is comprised of the slope difference from $A_2$ plus the threshold, which eliminates the effect of noise level output from differential amplifier $A_2$. Finally the output from amplifier $A_1$ in the form of a standardized pulse is shown in FIG. 2k.

A number of modifications are possible in the light of the above teachings. For example, since detection is made only on the charge cycle of the STC and LTC circuits, diodes $CR_3$ and $CR_4$ (shown dotted in FIG. 1) may be added for rapid discharge of the time constant circuits. This practically eliminates the negative spike of the difference signal as shown in FIG. 2f. Also, a capacitor could be added between pin 10 of amplifier $A_1$ and ground as an additional R.F. by-pass.

The values for the components shown in FIG. 1 are merely exemplary and were found satisfactory in practice. Amplifiers suitable for use in this circuit are integrated circuits from Motorola Corporation designated with part numbers MC 1520 for $A_1$ and MC 1545 for $A_2$. The pin numbers given in FIG. 1 refer to the Motorola Corporation amplifiers.

Thus, there has been disclosed an automatic signal detection circuit which maintains maximum receiver detection sensitivity and a fixed signal-to-noise ratio, even though the receiver noise output varies as a function frequency due to internal or external conditions. The prime use of this circuit is envisioned in receivers which are automatically frequency scanned and are required to detect and lock onto the frequency of pulsed and other types of emissions. It may also be used with minor modifications in mobile and other fixed-timed receivers for upgrading squelch, threshold and similar circuits to maintain maximum sensitivity.

Obviously, many modifications and variations of the present invention are possible in the light of the above teachings. It is therefore to be understood that within the scope of the appended claims the invention may be practiced otherwise than as specifically described.

I claim:

1. An automatic signal detection circuit providing reliable signal lock-on capability in the presence of varying noise levels comprising:
    means for detecting a signal;
    a long time constant circuit connected to said signal detecting means;
    a short time constant circuit connected to said signal detecting means and in parallel with said long time constant circuit; the ratio of the long time constant circuit to the short time constant circuit being such that their outputs due to noise are essentially equal;
    a differential amplifier receiving the output of the long time constant circuit and the short time constant circuit and producing an output representing the slope difference between the long time constant circuit and short time constant circuit when a signal is received.

2. The circuit of claim 1 including means for compensating for phase shift due to the difference between the long time constant circuit and short time constant circuit.

3. The circuit of claim 2 wherein said phase compensating means comprises a delay line.

4. The circuit of claim 3 wherein said delay line is a variable delay line.

5. The circuit of claim 4 including means for balancing the long time constant and short time constant circuits to compensate for attenuation differences in their outputs.

6. The circuit of claim 5 wherein said output balancing means comprises a potentiometer in the LTC circuit.

7. The circuit of claim 6 wherein said signal detection means comprises:
    a diode; and
    means for back biasing the diode to reduce its dynamic impedance to prevent attenuation of an incoming signal.

8. The circuit of claim 7 including means for rapidly discharging the long time constant and short time constant whereby negative peaks are substantially eliminated from the output of said differential amplifier.

9. The circuit of claim 8 wherein the time constant of the long time constant circuit is $15\mu$ seconds and the time constant of the short time constant circuit is $1\mu$ second.

10. The circuit of claim 9 including means for inhibiting said differential amplifier, said means comprising:
    a gate in said differential amplifier; and
    means for applying blanking pulses to said gate.

11. The circuit of claim 10 including a second differential amplifier receiving the output of the first differential amplifier for producing a standardized pulse output.

12. The circuit of claim 11 including means for applying an adjustable threshold voltage to said second differential amplifier for eliminating noise leakage from said first differential amplifier.

* * * * *